(12) United States Patent
Esch et al.

(10) Patent No.: US 8,892,106 B2
(45) Date of Patent: Nov. 18, 2014

(54) CELL TRANSFER CONTROLLER AND METHOD FOR SELECTING A RADIO CELL

(71) Applicant: Intel Mobile Communications GmbH, Neubiberg (DE)

(72) Inventors: Michael Esch, Nuremberg (DE); Miroslaw Filipowicz, Stein (DE); Kumaran Subramanian, Nuremberg (DE); Dirk Nickisch, Neubiberg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 55 days.

(21) Appl. No.: 13/671,639

(22) Filed: Nov. 8, 2012

(65) Prior Publication Data

US 2014/0128083 A1    May 8, 2014

(51) Int. Cl.
*H04W 88/02* (2009.01)
*H04W 36/30* (2009.01)
*H04W 36/26* (2009.01)

(52) U.S. Cl.
CPC .............. *H04W 36/30* (2013.01); *H04W 36/26* (2013.01)
USPC ......................................................... 455/450

(58) Field of Classification Search
USPC .................... 455/450, 439, 458, 422.1, 452.1
See application file for complete search history.

(56) References Cited

U.S. PATENT DOCUMENTS

2009/0274086 A1* 11/2009 Petrovic et al. ................ 370/312
2013/0109392 A1*  5/2013 Chun et al. .................... 455/436
2013/0265903 A1* 10/2013 Kim et al. ...................... 370/252

* cited by examiner

*Primary Examiner* — Diane Mizrahi

(57) ABSTRACT

A cell transfer controller is described comprising a detector configured to detect radio cells available for a mobile terminal; a determiner configured to determine, for a first radio cell detected by the detector, a waiting period after which the radio cell is selectable by the cell transfer controller as a target cell for a cell transfer and a controller, configured to increase the length of the waiting period in case that during the waiting period, the detector detects a second radio cell which fulfills a predetermined criterion.

21 Claims, 11 Drawing Sheets

CELL TRANSFER CONTROLLER AND METHOD FOR SELECTING A RADIO CELL

TECHNICAL FIELD

The present disclosure relates to cell transfer controllers and methods for selecting a radio cell.

BACKGROUND

Due to its mobility, a mobile terminal, such as a subscriber terminal of a cellular mobile communication network, needs to be able to perform a transfer, such as a cell reselection, from its current serving radio cell to another radio cell, e.g. in case that it moves out of the coverage area of its current serving radio cell. This includes the selecting of a radio cell as a target for a reselection. To avoid frequent reselections, which would exhaust the mobile terminal's battery power, it is desirable to efficiently select target cells for reselections.

SUMMARY

A cell transfer controller is described including a detector configured to detect radio cells available for a mobile terminal; a determiner configured to determine, for a first radio cell detected by the detector, a waiting period after which the radio cell is selectable by the mobile terminal as a target cell for a cell transfer and a controller, configured to increase the length of the waiting period in case that during the waiting period, the detector detects a second radio cell which fulfills a predetermined criterion.

Further, a method for selecting a radio cell according to the cell transfer controller is described.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

In the following, a cellular mobile communication system according to LTE is described as an example. It should be noted that communication systems according to other communication standards, such as UMTS (Universal Mobile Communications System) and GSM (Global System for Mobile Communication) may be used.

Figure 1:
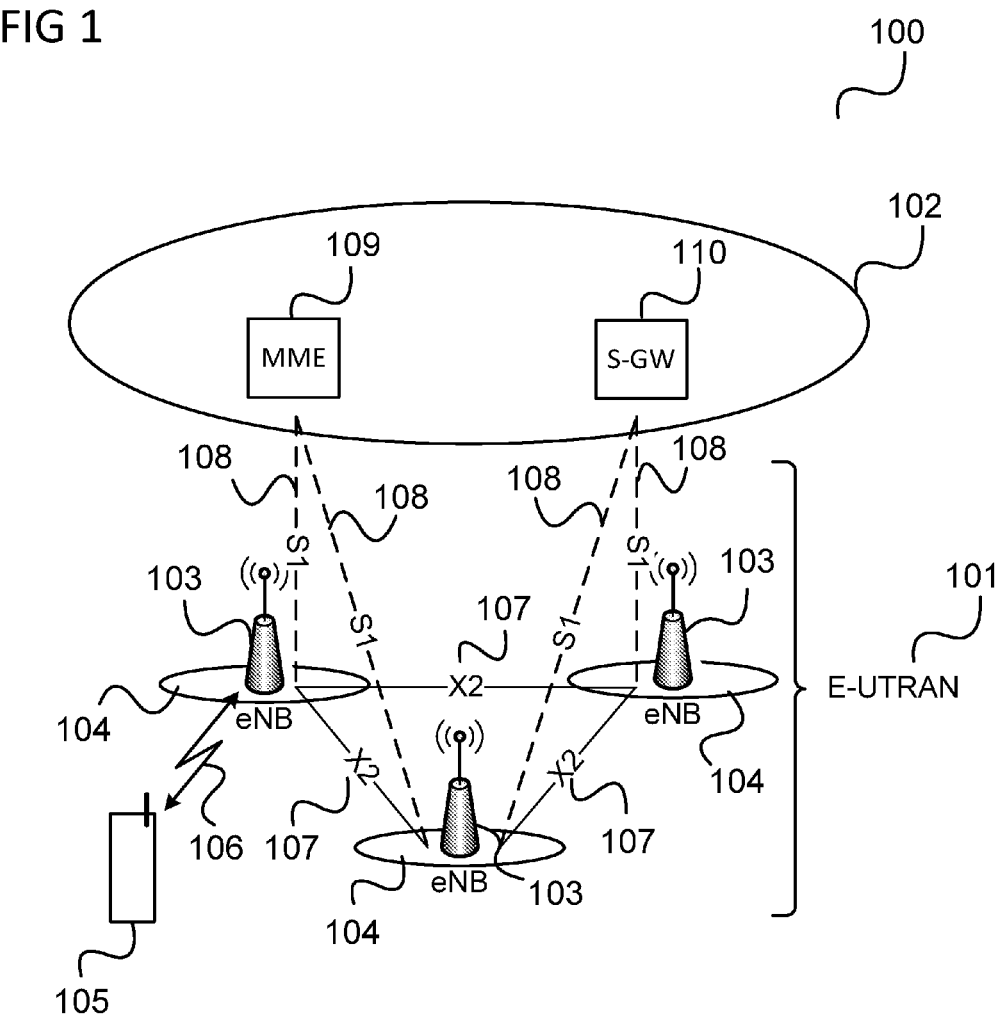
FIG. 1 shows a communication system.

FIG. 1 shows a communication system 100.

The communication system 100 is a cellular mobile communication system (also referred to as cellular radio communication network in the following) including a radio access network (e.g. an E-UTRAN, Evolved UMTS Terrestrial Radio Access Network according to LTE (Long Term Evolution)) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment) 105 located in a mobile radio cell 104 may communicate with the core network 102 and with other mobile terminals 105 via the base station providing coverage in (in other words operating) the mobile radio cell. In other words, the base station 103 operating the mobile radio cell 104 in which the mobile terminal 105 is located provides the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109 via a S1-MME interface and to a Serving Gateway (S-GW) 110 by means of an S1-U interface. The S1 interface supports a many-to-many relation between MMEs/S-GWs 109, 110 and the base stations 103, i.e. a base station 103 can be connected to more than one MME/S-GW 109, 110 and an MME/S-GW can 109, 110 be connected to more than one base station 103. This enables network sharing in LTE.

For example, the MME 109 may be responsible for controlling the mobility of mobile terminals located in the coverage area of E-UTRAN, while the S-GW 110 is responsible for handling the transmission of user data between mobile terminals 105 and core network 102.

In case of LTE, the radio access network 101, i.e. the E-UTRAN 101 in case of LTE, can be seen to consist of the base station 103, i.e. the eNBs 103 in case of LTE, providing the E-UTRA user plane (PDCP/RLC/MAC) and control plane (RRC) protocol terminations towards the UE 105.

An eNB 103 may for example host the following functions:
Functions for Radio Resource Management: Radio Bearer Control, Radio Admission Control, Connection Mobility Control, dynamic allocation of resources to UEs 105 in both uplink and downlink (scheduling);
IP header compression and encryption of user data stream;
Selection of an MME 109 at UE 105 attachment when no routing to an MME 109 can be determined from the information provided by the UE 105;
Routing of User Plane data towards Serving Gateway (S-GW) 110;
Scheduling and transmission of paging messages (originated from the MME);
Scheduling and transmission of broadcast information (originated from the MME 109 or O&M (Operation and Maintenance));
Measurement and measurement reporting configuration for mobility and scheduling;
Scheduling and transmission of PWS (Public Warning System, which includes ETWS (Earthquake and Tsunami Warning System) and CMAS (Commercial Mobile Alert System)) messages (originated from the MME 109);
CSG (Closed Subscriber Group) handling.

Each base station of the communication system 100 controls communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located (and on which it is camping). If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

As the mobile terminal 105 continues to move throughout the coverage area of the communication system 100, the mobile radio cell 104 on which the mobile terminal 105 is camping (e.g. via which it receives paging messages when in idle mode) or, in case the mobile terminal 105 has a communication connection such as a call via the radio access network 101, the mobile radio cell 104 which provides and controls the communication connection may change. In other words, there may be a cell transfer for the mobile terminal 105 between neighboring mobile radio cells 104. The transfer of call from mobile radio cell 104 to another mobile radio cell 104 may be done by a network-initiated handover (or handoff), e.g. in case the mobile terminal 105 has a communication connection via the radio access network 101 or a UE-initiated cell reselection, e.g. when the mobile terminal 105 is in idle mode or also for example for a packet-switched communication connection in case that the mobile terminal 105 is in connected mode.

Control of a call may also occur between base stations 103 operating according to different radio access technologies (RATs) such as UMTS and GSM. This is illustrated in FIG. 2.

Figure 2:
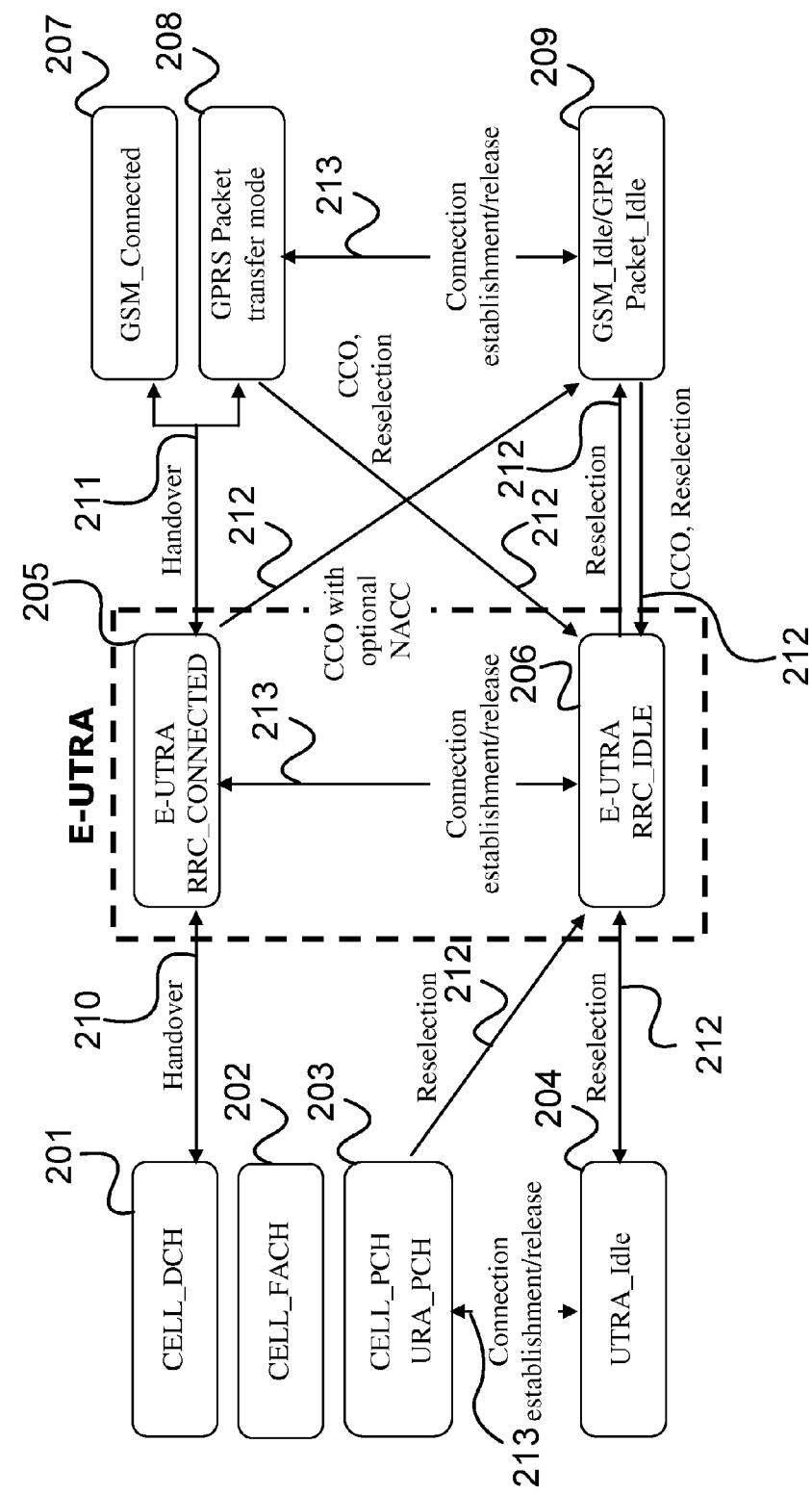
FIG. 2 shows a state diagram.

FIG. 2 shows a state diagram 200.

The state diagram 200 includes the UMTS (UTRA, 3G) mobile terminal states CELL_DCH 201, CELL_FACH 202, CELL_PCH/URA_PCH 203, and UTRA_Idle 204, the LTE (E-UTRA) mobile terminal states RRC CONNECTED 205 and RRC IDLE 206 and the GSM (GERAN, 2G and 2.5G) mobile terminal states GSM_Connected 207, GPRS Packet Transfer Mode 208, and GSM_Idle/GPRS Packet_Idle 209. Contrary to UMTS, there are only two E-UTRA RRC states defined for the mobile terminal 105. FIG. 2 can be seen to illustrate the mobility support between E-UTRA, UTRA and GERAN.

According to a first state transition 210, a transfer of a connection may be carried out between E-UTRA (i.e. a base station 103 operating according to LTE) and UTRAN (i.e. a base station 103 operating according to UTMS).

According to a second state transition 211, a transfer of a connection may be carried out between E-UTRA (i.e. a base station 103 operating according to LTE) and GERAN (i.e. a base station 103 operating according to GSM).

Third state transitions 212 may occur between states of the UTRAN, the GERAN, and the E-UTRAN, e.g. in case of cell reselection without the transfer of an active call. It should be noted that state transitions between states of the UTRAN and GERAN are omitted for simplicity but may also be possible.

Fourth state transitions 213 may occur between states of the same radio access technology, e.g. when a connection is released or a connection is established. The mobile terminal 105 is in RRC_CONNECTED when an RRC connection has been established. If this is not the case, i.e. no RRC connection is established, the mobile terminal 105 is in RRC_IDLE state.

Figure 3:
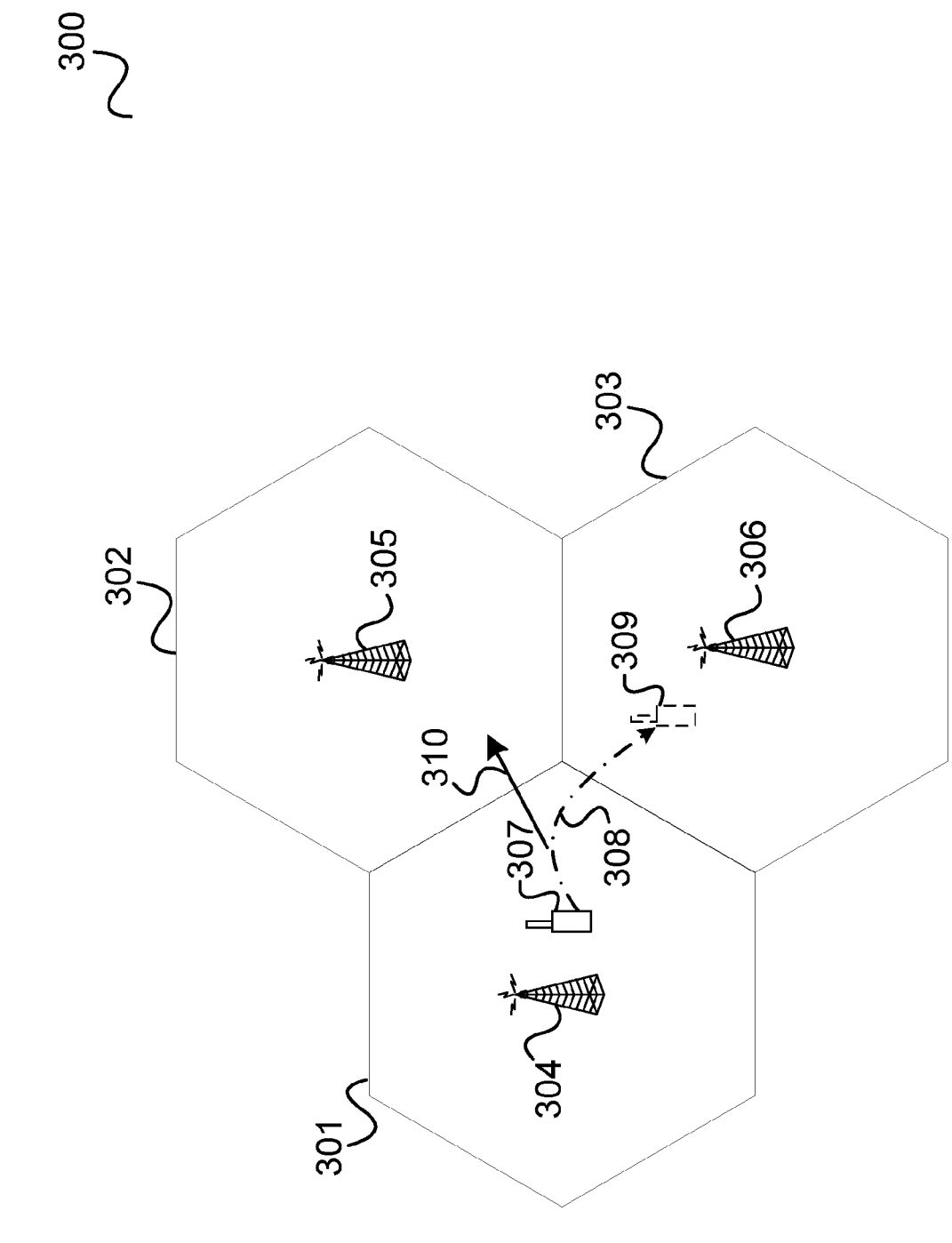
FIG. 3 shows a radio cell arrangement.

An example for a possible scenario is given in FIG. 3.

FIG. 3 shows a radio cell arrangement 300.

The radio cell arrangement 300 includes a first radio cell 301 ("cell x") operated according to LTE, for example corresponding to one of the radio cells 104, a second radio cell 302 ("cell y") operated according to UMTS (or, in other words, according WCDMA (Wideband Code Division Multiple Access)) and a third radio cell 303 ("cell z") operated according to LTE, for example corresponding to one of the radio cells 104.

The first radio cell 301 is operated by a first base station 304, the second radio cell 302 is operated by a second base station 305 and the third base station 303 is operated by a third base station 306.

A mobile terminal 307, for example corresponding to the mobile terminal 105, is assumed to support communication according to LTE as well as communication according to UMTS. The mobile terminal 307 is assumed to be camping on the first radio cell 301 and to then start moving along a path 308 to a position 309 in the third radio cell 303.

According to 3GPP (Third Generation Partnership Project) the mobile terminal 307 (in this example a UE) reselects (or, in other words, performs a reselection) to a cell 302, 303 if (and as soon as) the cell satisfies reselection criteria (as specified in 3GPP). This allows keeping the call setup success rate as high as possible. Further, ping-pong reselections may be avoided (i.e. a reselection from a first cell to a second cell and a reselection from the second cell to the first cell shortly after that).

An immediate reselection as soon as a cell 302, 303 satisfies the reselection criteria may however not be beneficial for the mobile terminal 307, e.g. in terms of battery consumption. For example, a reselection may be useless if the reselection is triggered immediately as soon as the target cell satisfies reselection criteria.

For example, in the scenario illustrated in FIG. 3, since according to the path 308 of the mobile terminal 307 the mobile terminal 307 at first moves in a direction 310 leading to the second radio cell 302, the second cell 302 may be detected and reselection criteria (such as a reception quality criterion) may be fulfilled for the second cell 302 earlier than for the third cell 303. Accordingly, the mobile terminal 307 may reselect to the second radio cell 302. Since after the initial direction 310, the path 308 changes direction and leads to the third radio cell 303, the mobile terminal 307 may shortly after the selection to the second radio cell 302 reselect to the third radio cell 303. This is illustrated in FIG. 4.

Figure 4:
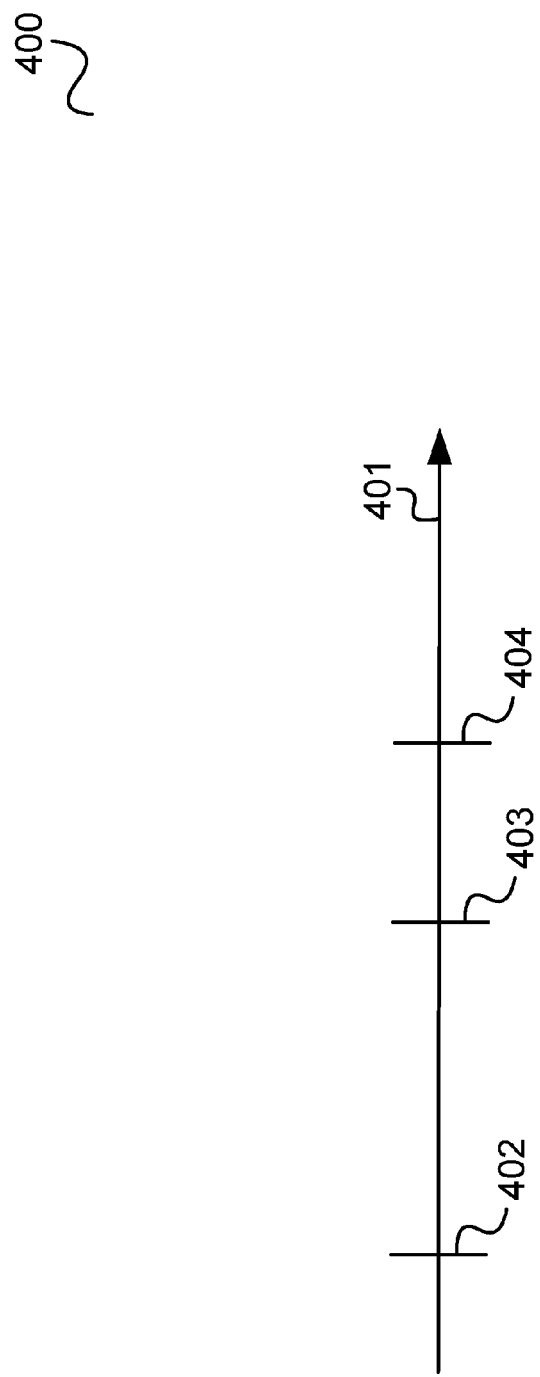
FIG. 4 shows a flow diagram illustrating a scenario with two cell reselections within a short amount of time.

FIG. 4 shows a flow diagram 400.

In FIG. 4, time flows from left to right along a time axis 401. It is assumed that the mobile terminal 307 camps on the first radio cell 301 at a first time 402. At a second time 403, after the mobile terminal 307 has moved along the direction 310, the mobile terminal 307 reselects to the second radio cell 302. When the mobile terminal 307 has further followed the path 308 in the direction of the third radio cell 302 the mobile terminal 307 selects to the third radio cell 302 at a third time 404. Since the mobile terminal 307 only camps on the second radio cell 302 for a short period of time the reselection to the second radio cell 302 can be seen as useless.

Since a cell reselection involves system information reading useless cell reselections (Intra-RAT as well as Inter-RAT cell reselection) unnecessarily consume battery power reducing the idle mode standby time of the mobile terminal 307 while avoiding useless cell reselection (Intra-RAT as well as Inter-RAT cell reselection) reduces battery consumption.

Figure 5:
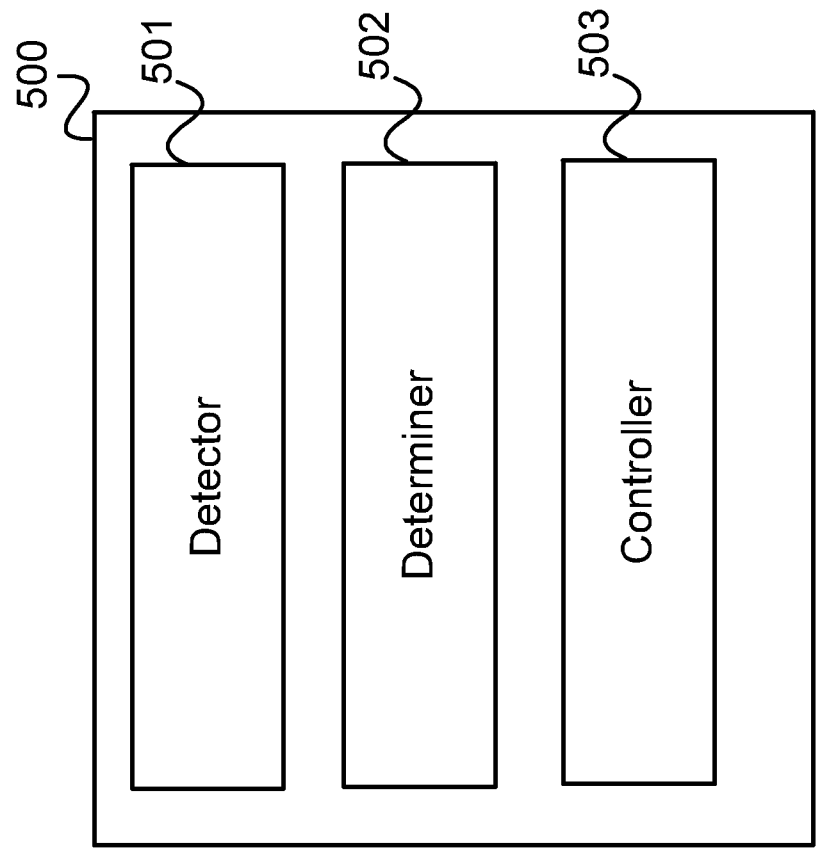
FIG. 5 shows a cell transfer controller.

An example for a cell transfer controller, which is for example arranged in the mobile terminal or alternatively on the network side, that may support identifying potentially useless cell reselections, or generally cell transfers, and avoiding useless cell transfers is illustrated in FIG. 5.

FIG. 5 shows a cell transfer controller 500.

The cell transfer controller 500 includes a detector 501 configured to detect radio cells available for a mobile terminal and a determiner 502 configured to determine, for a first radio cell detected by the detector, a waiting period after which the radio cell is selectable by the mobile terminal as a target cell for a cell transfer.

The cell transfer controller 500 further includes a controller 502, configured to increase the length of the waiting period in case that during the waiting period, the detector detects a second radio cell which fulfills a predetermined criterion.

In other words, a cell transfer controller may set the time, at which a transfer to a cell is performed, to a later time if (e.g. in the meantime since the detection of the cell) a second cell has been detected.

The waiting period is for example determined according to the parameter Treselection according to 3GPP. For example, when the period according to Treselection experies for a detected radio cell (e.g. a neighbor the of cell on which the mobile terminal currently camps) but a waiting period for a second cell (e.g. of higher rank/higher priority) is started or running, the cell transfer controller postpones the possible transfer in order to let the Treselection timer (i.e. the second waiting period) of the second cell expire, and may at the end reselect to the second cell, such that useless intermediate cell transfer to the first cell is avoided.

The components of the cell transfer controller 500 (e.g. the detector 501, the determiner 502, the controller, etc.) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

The determiner is for example configured to determine the waiting period to have a first length and the controller is configured to increase the length of the waiting period to a second length in case that during the waiting period, the detector detects a second radio cell which fulfills a predetermined criterion.

The radio cell for example needs to fulfill a quality criterion during the waiting period of the first length to be selectable by the cell transfer controller as a target cell for a cell transfer after the waiting period.

In case that the controller increases the length of the waiting period, the radio cell may for example need to fulfill the quality criterion during the waiting period of the second length to be selectable by the cell transfer controller as a target cell for a cell transfer after the waiting period.

For example, the quality criterion is that the reception quality of the first radio cell at the mobile terminal is above a predetermined threshold.

The predetermined criterion is for example fulfilled if the second radio cell has a higher selection priority than the first radio cell and/or the predetermined criterion is fulfilled if the second radio cell has a better reception quality at the mobile terminal than the first radio cell. The reception quality of a radio cell at the mobile terminal is for example better than reception quality of another radio cell at the mobile terminal if the reception power level of signals of the radio cell (e.g. sent by a base station operating the radio cell) received by the mobile terminal is higher than the reception power level of signals of the other radio cell (e.g. sent by a base station operating the other radio cell) received by the mobile terminal and/or if the bit error rate of signals of the radio cell (e.g. sent by a base station operating the radio cell) received by the mobile terminal is lower than the bit error rate of signals of the other radio cell (e.g. sent by a base station operating the radio cell) received by the mobile terminal.

The determiner may further be configured to determine a second waiting period after which the second radio cell is selectable by the cell transfer controller as a target cell for a cell transfer.

The controller may be configured to increase the length of the waiting period such that the waiting period contains the second waiting period.

The second radio cell for example needs to fulfill a second quality criterion during the second waiting period to be selectable by the cell transfer controller as a target cell for a cell transfer after the second waiting period.

The second quality criterion is for example that the reception quality of the second radio cell at the cell transfer controller is above a second predetermined threshold.

The controller is for example configured to decrease the waiting period in case that during the second waiting period, the second radio cell does not fulfill the second quality criterion.

For example, the controller is configured to end the waiting period during the second waiting period when the second radio violates the second quality criterion.

The cell transfer is for example a cell transfer from a current radio cell of the mobile terminal and the waiting period is decreased in case that the current radio cell violates a serving cell criterion.

For example, the waiting period is ended when the current radio cell violates the serving cell criterion.

The serving cell criterion is for example based on the reception quality of the current radio cell at the mobile terminal. For example, the serving cell criterion is violated when the reception quality of the current radio cell at the mobile terminal falls below a further predetermined threshold or is expected to fall below the further predetermined threshold within a certain time.

The mobile terminal is for example a subscriber terminal of a cellular mobile communication network and the radio cells are for example radio cells of the cellular mobile communication network.

Figure 6:
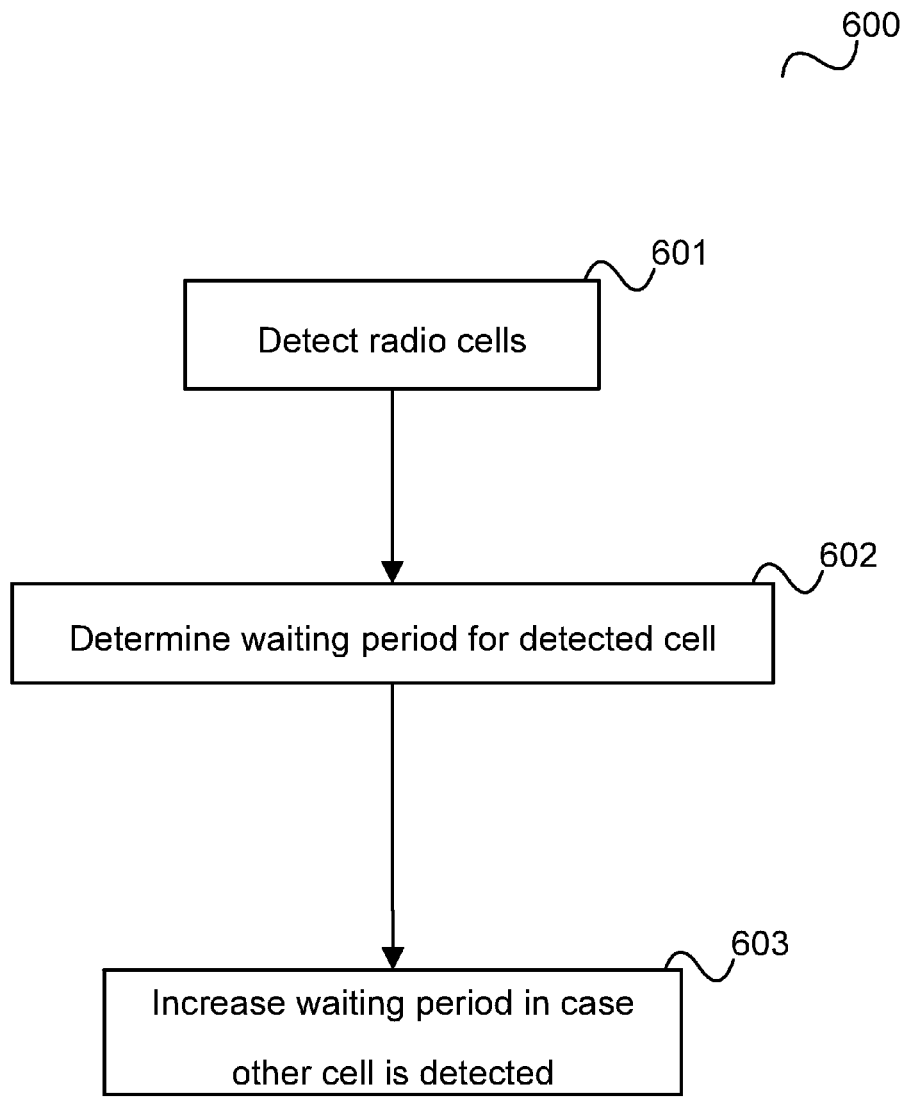
FIG. 6 shows a flow diagram illustrating a method for selecting a radio cell.

The cell transfer controller for example carries out a method as illustrated in FIG. 6. In should be noted that aspects described in context of the method described with reference to FIG. 6 are analogously valid for the cell transfer controller 500 and vice versa.

FIG. 6 shows a flow diagram 600.

The flow diagram 600 illustrates a method for selecting a radio cell, e.g. as a target cell for a transfer from a current (serving) radio cell to the target cell.

In 601, the cell transfer controller, for example, detects radio cells available for a mobile terminal.

In 602, the cell transfer controller, for example, determines, for a first radio cell detected by the detector, a waiting period after which the radio cell is selectable by the cell transfer controller as a target cell for a cell transfer.

In 603 the cell transfer controller, for example, increases the length of the waiting period in case that during the waiting period, a second radio cell is detected which fulfills a predetermined criterion.

In other words, the cell transfer controller may identify a potentially useless transfer and avoid a useless cell transfer. For example, in the scenario of FIG. 3, if a period according to Treselection expires for the second radio cell 302, the mobile terminal 307 could immediately reselect to the second radio cell but at that moment if a period according to Treselection of the third radio cell 303 is started or already running and if the third radio cell for example has higher rank (e.g. better reception quality at the mobile terminal 307 (at the time the waiting period for the second radio cell 302 expires) or higher (e.g. operator-defined) priority) transfer to the second radio cell 302 can be considered and identified as being potentially useless.

Since the transfer to the second radio cell 302 is identified as being potentially useless in this example, the cell transfer controller 307 postpones the transfer to the second radio cell 302 until the waiting period for the second radio cell 302 expires and may in the end (i.e. after the end of the waiting period of the third radio cell 303) decide to select to the third radio cell 303 instead of the second radio cell, e.g. due to the fact that the third radio cell 303 fulfills the transfer criteria and has higher rank than the second radio cell 302.

The cell transfer controller 500 may for example be part of the mobile terminal 500 itself. Alternatively, the cell transfer controller 500 may be part of the network side, e.g. the radio access network 101, e.g. in a radio network controller. In case that the cell transfer controller 500 is part of the network side, it may for example receive information from the mobile terminal based on which it checks the predetermined criterion and/or the quality criterion. For example, the mobile terminal may send information about the reception quality of one or more radio cells, e.g. the first cell and/or the second cell to the cell transfer controller which is received by the cell transfer controller 500.

Depending on whether the cell transfer controller 500 is arranged in the mobile terminal itself or on the network side, the detection of radio cells may be based on a detection process by measuring signals or based on information received from the mobile terminal, e.g. based on an indication from the mobile terminal which cells are available for the mobile terminal, respectively.

A radio cell being selectable by the cell transfer controller 500 may be understood as the radio cell being selectable for the mobile terminal (e.g. as a serving cell and/or a cell to camp upon). In case that the cell transfer controller 500 is arranged in the mobile terminal, a radio cell being selectable by the cell transfer controller 500 may be understood as the radio cell being selectable by the mobile terminal.

In case that the cell transfer controller 500 is arranged on the network side, it may send the result of a decision about a cell transfer to the mobile terminal, e.g. as a cell transfer instruction.

In the following, examples are described in which the mobile terminal includes the cell transfer controller 500 and in which the (possible) cell transfer is a cell reselection. These may be analogously applied to the scenario where the cell transfer controller 500 is arranged on the network side, e.g. by including corresponding signalling (e.g. of reception quality or cell transfer instructions) between the mobile terminal and the cell transfer controller 500 and/or to the scenario where the cell transfer is a handover.

Figure 7:
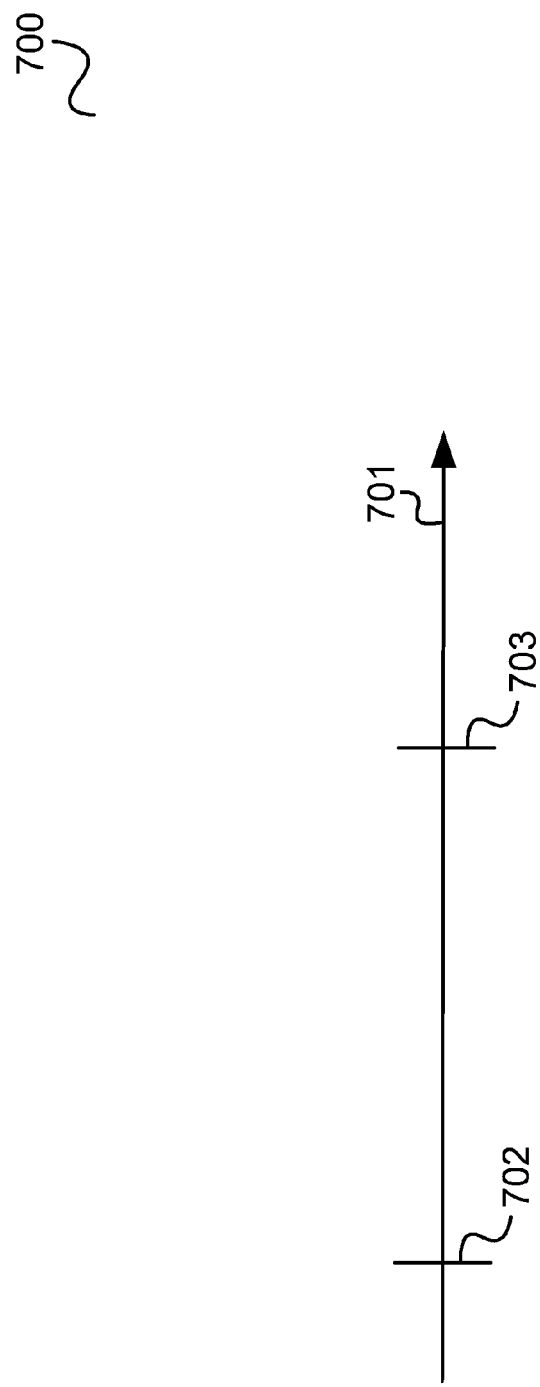
FIG. 7 shows a flow diagram illustrating the avoiding of two cell reselections within a short amount of time.

FIG. 7 shows a flow diagram 700.

Time flows along a time axis 701.

It is assumed that the mobile terminal 307 camps on the first radio cell 301 at a first time 702. The mobile terminal 307 then travels in the direction 310, detects the second radio cell 302 and starts the waiting period for the second radio cell 302. It is assumed that during the waiting period for the second radio cell 302, the mobile terminal 307, travelling further on the path 308, detects the third radio cell 303.

As an example, the mobile terminal 307 may be configured to increase the length of the waiting period for the second radio cell 302 in response to the detection of the third radio cell 303, for example may be configured to increase the length of the waiting period for the second radio cell 302 if the reception quality of the third radio cell 303 is higher than the reception quality of the second radio cell 302 when the third radio cell 303 is detected, e.g. due to the fact that during the waiting period for the second radio cell 302 the mobile terminal 307 has moved into the direction of the third radio cell 303, and/or may be configured to increase the length of the waiting period for the second radio cell 302 if the third radio cell 303 has a higher priority than the second radio cell 302.

Alternatively, the mobile terminal 307 may be configured to increase the length of the waiting period for the second radio cell 302 if at the end of the waiting period for the second radio cell the reception quality of the third radio cell 303 is higher than the reception quality of the second radio cell 302.

The mobile terminal 307 may further be configured to abort an ongoing cell reselection postponement (i.e. an extension of the waiting period for the second radio cell 302), e.g. decrease the waiting period, e.g. to the current time, i.e. end the waiting period immediately. For example, to have a high call setup success rate, the mobile terminal 307 may be configured to postpone a possible cell reselection only as long as the serving cell (i.e. the cell it is currently camping on, in this example the first radio cell 301) is suitable for camping, e.g. such that no paging messages are missed. As soon as it is detected that the serving cell becomes (or will soon become) unsuitable an ongoing cell-reselection postponement (if any) is aborted and reselection is immediately triggered, e.g. to the currently best cell, e.g. the cell with the highest reception quality at the mobile terminal 307.

A cell-reselection to a cell may for example be considered as being potentially useless according to one of the following:
a) consider (i.e. identify) the reselection as potentially useless only if the waiting period (e.g. according to Treselection) for another cell with higher priority than the cell is started or running.
b) consider the reselection as potentially useless only if the waiting period (e.g. according to Treselection) for another cell with higher rank than the cell is started or running.
c) consider the reselection as potentially useless only if the waiting period (e.g. according to Treselection) for another cell with higher rank and/or higher priority than the cell is started or running.

If a reselection is identified as potentially useless, the mobile terminal postpones the potentially useless reselection in order to let the waiting period (e.g. according to Treselection) of a preferred cell (e.g. a cell with higher priority and/or rank) cell expire. As the radio conditions can change until the Treselection expiry of the preferred cell, one of the following may for example be done:
a) at any point in-time at most one possible reselection is postponed;
b) more than one possible reselection may be postponed;
c) a reselection is postponed only once;
d) a possible reselection may be postponed more than once (e.g. infinitely or for a configurable maximum number of times or for a configurable maximum timer value)
Combinations of the above a) to d) may also be done, if applicable.

An ongoing cell reselection postponement may for example be aborted according to one of the following:
a) If the serving cell becomes no longer a suitable cell;
b) If the serving cell is expected to become no longer a suitable cell in the next DRX (discontinuous reception) cycle (e.g. based on the serving cell measurement history);
c) If the preferred cell becomes no longer a reselection candidate cell (e.g. in case the reception quality of the preferred cell, in this example the third cell 303, drops below a threshold).
Combinations of the above a) to c) may also be done, if applicable.

It should be noted that a cell reselection to a radio cell is for example only done when the radio cell fulfills the reselection criteria. For example, a first cell has fulfilled the reselection for the whole waiting period for the first cell but a reselection to the first cell is not performed because a second radio cell with higher priority whose waiting period has not yet expired also fulfills the reselection criteria. In case that neither the first cell nor the second cell fulfill the reselection criteria at the end of the waiting period for the second cell, the mobile terminal neither reselects to the first radio cell nor the second radio cell, for example.

In the following, examples for the selection procedure of a target cell for a reselection in the communication arrangement 300 shown in FIG. 3 are described with reference to FIG. 8 to FIG. 11. In the following examples, it is assumed that the first radio cell 301 has lowest priority among the cells 301, 302, 303, the second radio cell 302 has medium priority and the third radio cell 303 has highest priority. In the example illustrated in FIG. 11, it is assumed that there is a fourth radio cell (not shown in FIG. 3) which also has highest priority. In the following examples, the first radio cell 301, the second radio cell 302 and the fourth radio cell are LTE cells while the second radio cell is an UMTS (or, equivalently, a WCDMA) cell.

Figure 8:
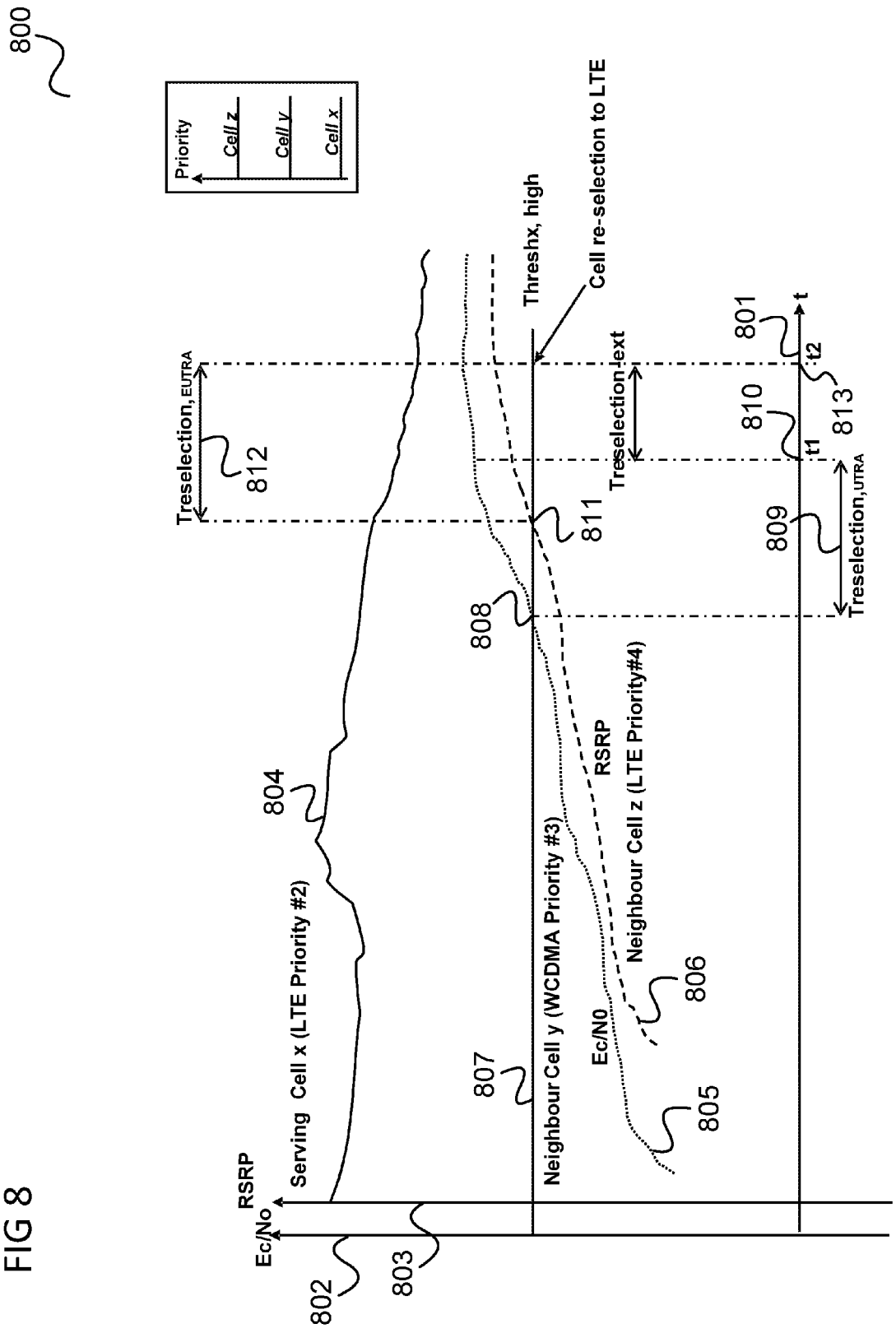
FIG. 8 shows a reception quality diagram illustrating the extension of a radio cell selection waiting period in a scenario with two detected radio cells.

FIG. 8 shows a reception quality diagram 800.

Time flows along a time axis 801 and reception quality increases along a Ec/No axis 802 (e.g. for UMTS cells) and a RSRP (Reference Signal Received Power) axis 803 (e.g. for LTE cells).

The reception quality of the first radio cell 301 at the mobile terminal 307 over time is given by a first graph 804, the reception quality of the second radio cell 302 at the mobile terminal 307 over time is given by a second graph 805 and the reception quality of the third radio cell 303 at the mobile terminal 307 over time is given by a third graph 806.

It is assumed that for a cell to be selectable as target cell for a reselection, the reception quality of the cell at the mobile terminal 307 needs to be above a reception quality threshold 807 during the waiting period for the cell, wherein the waiting period for the cell is started when the reception quality of the cell starts to be above the quality threshold 807.

It is assumed that initially the mobile terminal 307 is camping on the first cell 301. As illustrated by the first graph 804, the reception quality of the first cell 301 decreases (e.g. due to the path 308 taken by the mobile terminal 307 leading away from the first cell 301) so that a reselection to another cell may be desirable.

In this example, the reception quality of the second radio cell 302 starts to be above the quality threshold 807 at a first time 808. Accordingly, a waiting period for the second cell 809 is started, wherein the waiting period for the first second cell 809 is set to have a length, e.g. in accordance to Treselection, such that it ends at a first waiting period end point 810.

At a second time 811, the reception quality of the third radio cell 303 starts to be above the quality threshold 807. Accordingly, a waiting period for the third cell 812 is started, wherein the waiting period for the third cell 812 is set to have a length, e.g. in accordance to Treselection, to end at a second waiting period end point 813.

Further, since the third cell 303 has a higher priority than the second cell 302, the waiting period for the second cell 809 is extended to end at the second waiting period end point 813.

Since in this example, it is assumed that the reception quality of the third cell 303 is above the reception quality threshold 807 for the whole duration of the waiting period for the third cell 812, the mobile terminal 307 selects, after the waiting period for the third cell 812 has expired, the third radio cell as target for a reselection.

Figure 9:
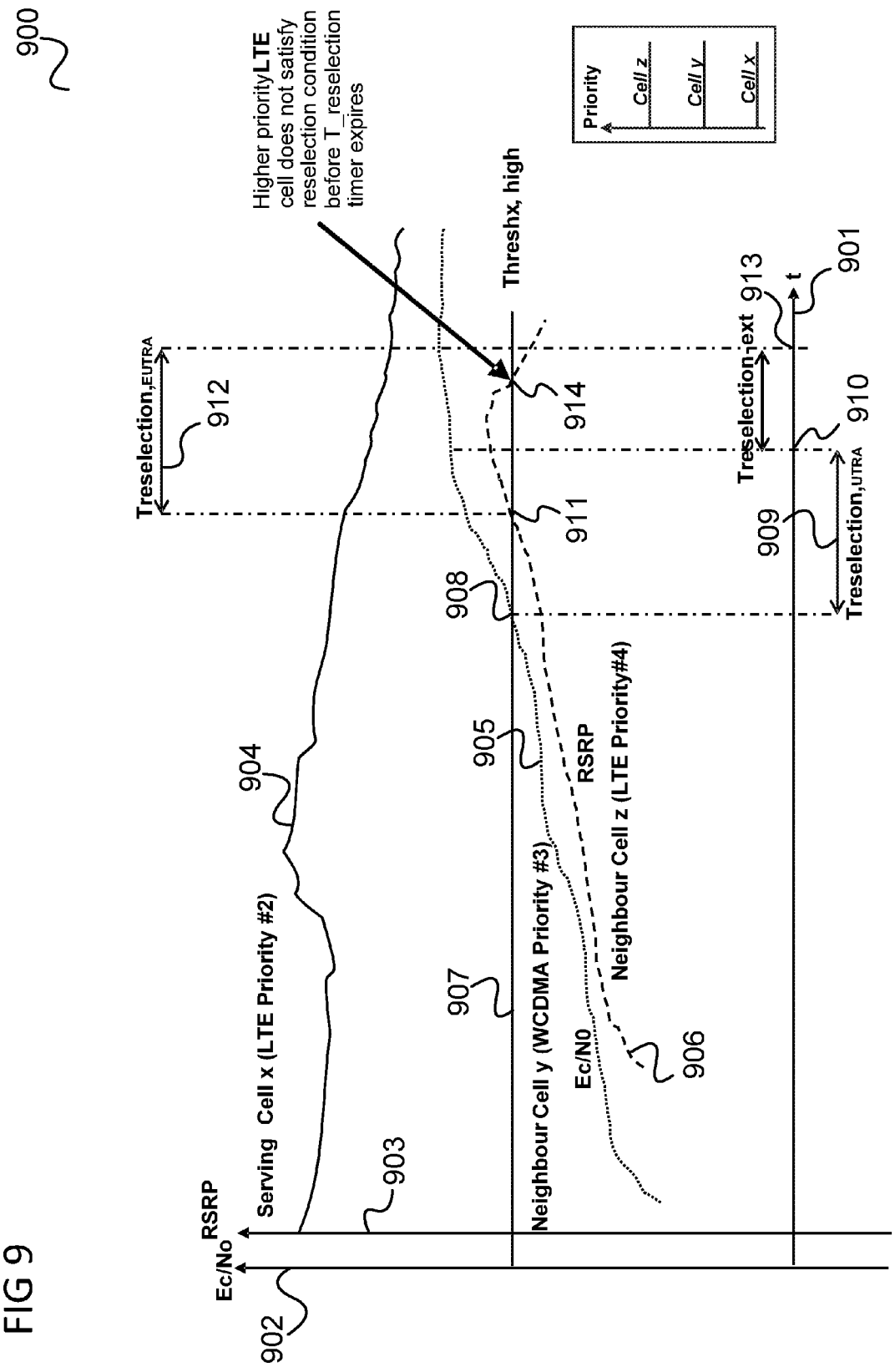
FIG. 9 shows a reception quality diagram illustrating the extension of a radio cell selection waiting period in a scenario with a reception quality drop of the radio cell detected second.

FIG. 9 shows a reception quality diagram 900.

Time flows along a time axis 901 and reception quality increases along a Ec/No axis 902 and a RSRP (Reference Signal Received Power) axis 903.

The reception quality of the first radio cell 301 at the mobile terminal 307 over time is given by a first graph 904, the reception quality of the second radio cell 302 at the mobile terminal 307 over time is given by a second graph 905 and the reception quality of the third radio cell 303 at the mobile terminal 307 over time is given by a third graph 906.

It is assumed that for a cell to be selectable as target cell for a reselection, the reception quality of the cell at the mobile terminal 307 needs to be above a reception quality threshold 907 during the waiting period for the cell, wherein the waiting period for the cell is started when the reception quality of the cell starts to be above the quality threshold 907.

It is assumed that initially the mobile terminal 307 is camping on the first cell 301. As illustrated by the first graph 904, the reception quality of the first cell 301 decreases (e.g. due to the path 308 taken by the mobile terminal 307 leading away from the first cell 301) so that a reselection to another cell may be desirable.

In this example, the reception quality of the second radio cell 302 starts to be above the quality threshold 907 at a first time 908. Accordingly, a waiting period for the second cell 909 is started, wherein the waiting period for the first second cell 909 is set to have a length, e.g. in accordance to Treselection, such that it ends at a first waiting period end point 910.

At a second time 911, the reception quality of the third radio cell 303 starts to be above the quality threshold 907. Accordingly, a waiting period for the third cell 912 is started, wherein the waiting period for the third cell 912 is set to have a length, e.g. in accordance to Treselection, to end at a second waiting period end point 913.

Further, since the third cell 303 has a higher priority than the second cell 302, the waiting period for the second cell 909 is extended to end at the second waiting period end point 913.

In this example, it is assumed that the reception quality of the third cell 303 falls below the reception quality threshold 907 at a third time 914. Accordingly, the extension of the waiting period for the second radio cell 909 is aborted and the second radio cell 302 is selected as target cell for a reselection without waiting for the extended waiting period to expire.

Figure 10:
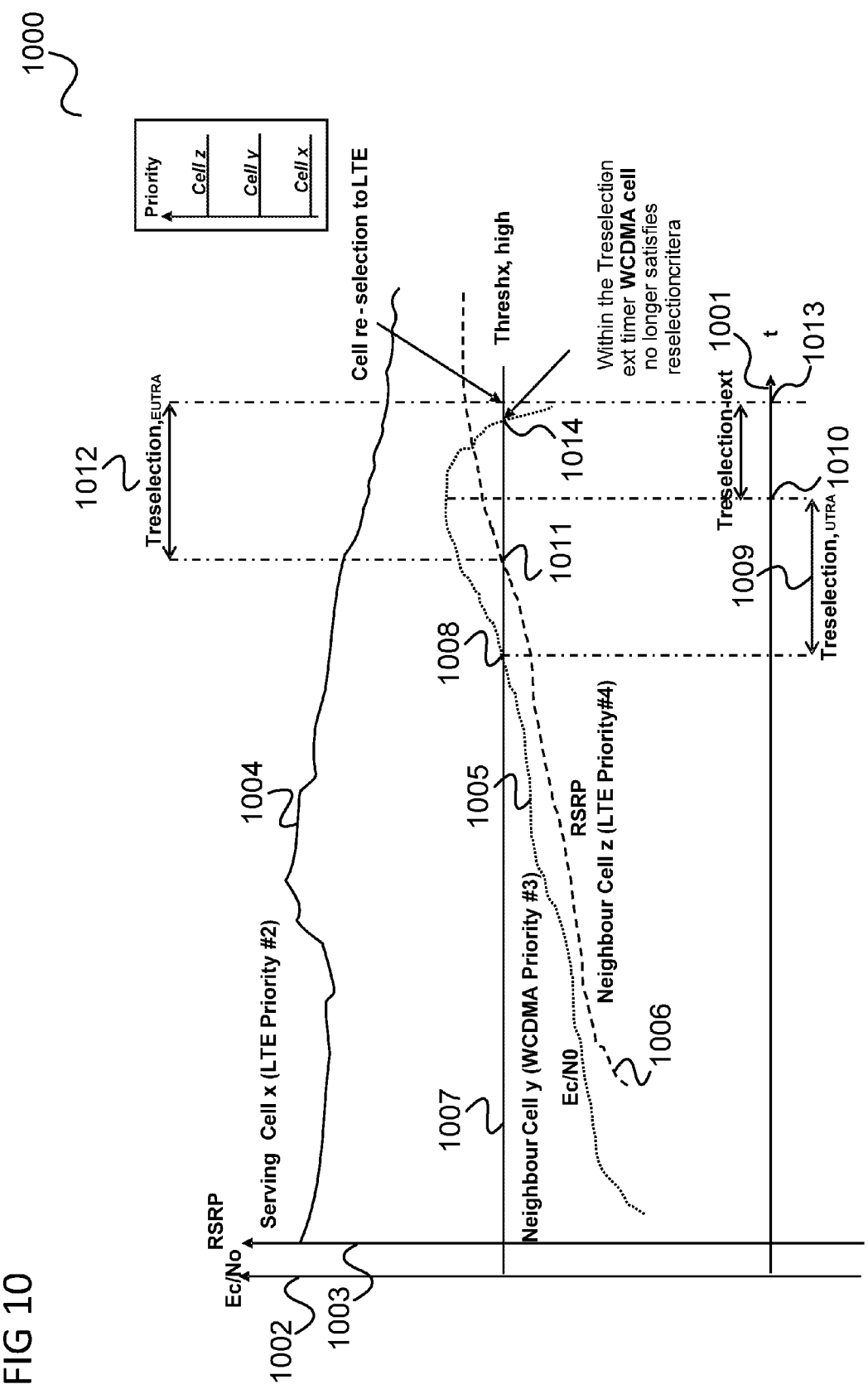
FIG. 10 shows a reception quality diagram illustrating the extension of a radio cell selection waiting period in a scenario with a reception quality drop of the radio cell detected first.

FIG. 10 shows a reception quality diagram 1000.

Time flows along a time axis 1001 and reception quality increases along a Ec/No axis 1002 and a RSRP (Reference Signal Received Power) axis 1003.

The reception quality of the first radio cell 301 at the mobile terminal 307 over time is given by a first graph 1004, the reception quality of the second radio cell 302 at the mobile terminal 307 over time is given by a second graph 1005 and the reception quality of the third radio cell 303 at the mobile terminal 307 over time is given by a third graph 1006.

It is assumed that for a cell to be selectable as target cell for a reselection, the reception quality of the cell at the mobile terminal 307 needs to be above a reception quality threshold 1007 during the waiting period for the cell, wherein the waiting period for the cell is started when the reception quality of the cell starts to be above the quality threshold 1007.

It is assumed that initially the mobile terminal 307 is camping on the first cell 301. As illustrated by the first graph 1004, the reception quality of the first cell 301 decreases (e.g. due to the path 308 taken by the mobile terminal 307 leading away from the first cell 301) so that a reselection to another cell may be desirable.

In this example, the reception quality of the second radio cell 302 starts to be above the quality threshold 1007 at a first time 1008. Accordingly, a waiting period for the second cell 1009 is started, wherein the waiting period for the first second cell 1009 is set to have a length, e.g. in accordance to Treselection, such that it ends at a first waiting period end point 1010.

At a second time 1011, the reception quality of the third radio cell 303 starts to be above the quality threshold 1007. Accordingly, a waiting period for the third cell 1012 is started, wherein the waiting period for the third cell 1012 is set to have a length, e.g. in accordance to Treselection, to end at a second waiting period end point 1013.

Further, since the third cell 303 has a higher priority than the second cell 302, the waiting period for the second cell 1009 is extended to end at the second waiting period end point 1013.

In this example, it is assumed that the reception quality of the third cell 303 is above the reception quality threshold 1007 for the whole duration of the waiting period for the third cell 1012 while the reception quality of the second cell 302 falls below the reception quality threshold 1007 at a third time 1014 which is between the first waiting period endpoint 1010 and the second waiting period endpoint 1013. Accordingly, the mobile terminal 307 selects, after the waiting period for the third cell 812 has expired, the third radio cell as target for a reselection. This example illustrates that it has been advantageous to extend the waiting period for the first radio cell 1009 rather than selecting the second radio cell 302 as a target for a reselection after the (unextended) waiting period for the first radio cell 1009 since a reselection away from the second radio cell 302 would presumably have soon been required.

Figure 11:
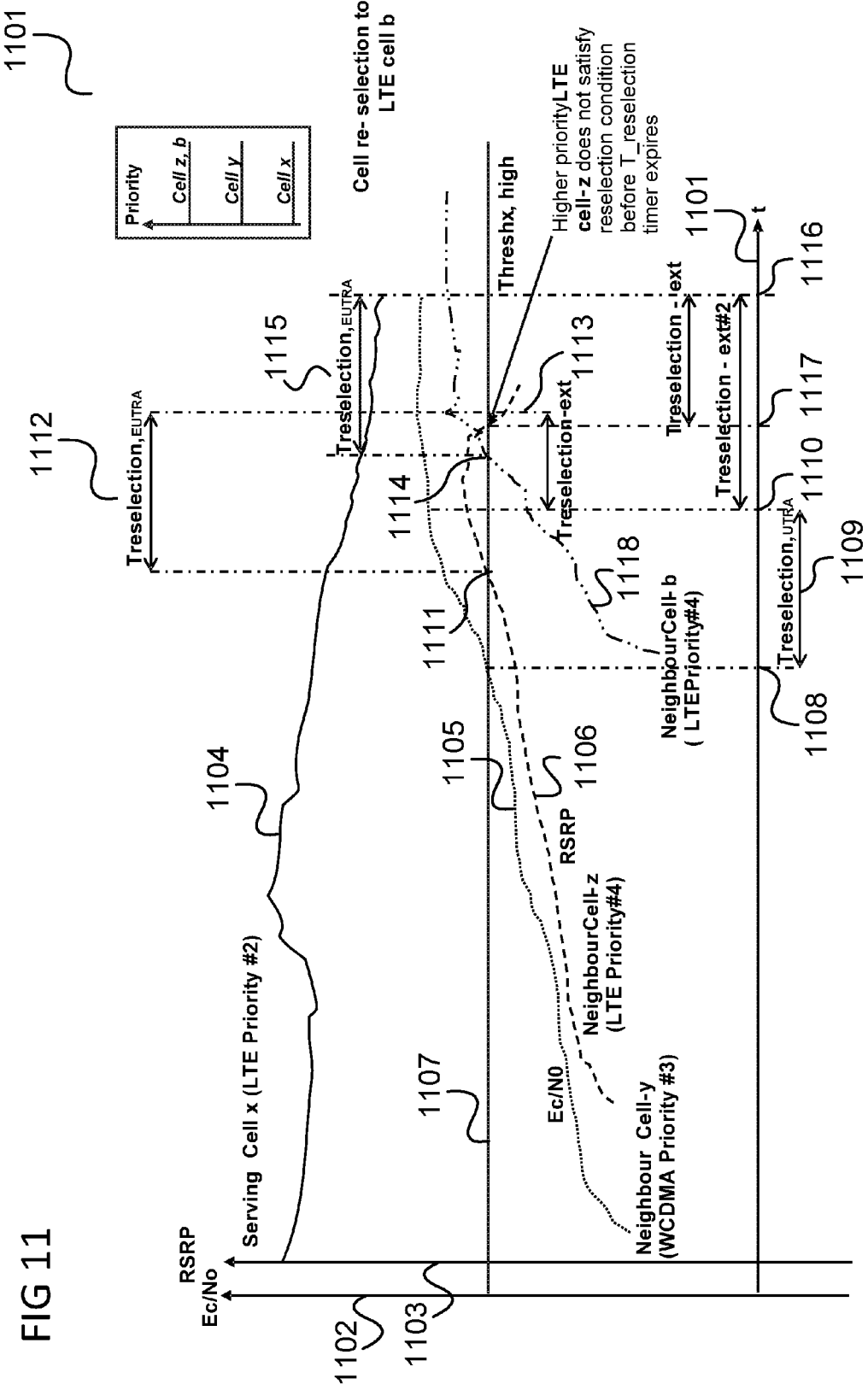
FIG. 11 shows a reception quality diagram illustrating the extension of a radio cell selection waiting period in a scenario with three detected radio cells.

FIG. 11 shows a reception quality diagram 1100.

Time flows along a time axis 1101 and reception quality increases along a Ec/No axis 1102 and a RSRP (Reference Signal Received Power) axis 1103.

The reception quality of the first radio cell 301 at the mobile terminal 307 over time is given by a first graph 1104, the reception quality of the second radio cell 302 at the mobile terminal 307 over time is given by a second graph 1105 and the reception quality of the third radio cell 303 at the mobile terminal 307 over time is given by a third graph 1106. It is further assumed that a fourth cell (denoted as "cell b") is present whose reception quality over time is given by a fourth graph 1118.

It is assumed that for a cell to be selectable as target cell for a reselection, the reception quality of the cell at the mobile terminal 307 needs to be above a reception quality threshold 1107 during the waiting period for the cell, wherein the waiting period for the cell is started when the reception quality of the cell starts to be above the quality threshold 1107.

It is assumed that initially the mobile terminal 307 is camping on the first cell 301. As illustrated by the first graph 1104, the reception quality of the first cell 301 decreases (e.g. due to the path 308 taken by the mobile terminal 307 leading away from the first cell 301) so that a reselection to another cell may be desirable.

In this example, the reception quality of the second radio cell 302 starts to be above the quality threshold 1107 at a first time 1108. Accordingly, a waiting period for the second cell 1109 is started, wherein the waiting period for the first second cell 1109 is set to have a length, e.g. in accordance to Treselection, such that it ends at a first waiting period end point 1110.

At a second time 1111, the reception quality of the third radio cell 303 starts to be above the quality threshold 1107. Accordingly, a waiting period for the third cell 1112 is started, wherein the waiting period for the third cell 1112 is set to have a length, e.g. in accordance to Treselection, to end at a second waiting period end point 1113.

Further, since the third cell 303 has a higher priority than the second cell 302, the waiting period for the second cell 1109 is extended to end at the second waiting period end point 1113.

At a third time 1114, the reception quality of the fourth radio cell starts to be above the quality threshold 1107. Accordingly, a waiting period for the fourth cell 1115 is started, wherein the waiting period for the fourth cell 1115 is set to have a length, e.g. in accordance to Treselection, to end at a third waiting period end point 1116.

Further, since the fourth cell has a higher priority than the second cell 302, the waiting period for the second cell 1109 is further extended to end at the third waiting period end point 1116.

It should be noted that at a fourth time 1117, the reception quality level of the third cell 303 falls below the quality threshold 1107 such that, as in the example described with FIG. 9, the extension of the waiting period for the second radio cell 1109 would be aborted. However, since the reception quality of the fourth radio cell is still above the reception quality threshold 1107, the extension of the waiting period for the second radio cell 1109 to the third waiting period endpoint 1116 stays valid.

In this example, it is assumed that the reception quality of the fourth cell is above the reception quality threshold 1107 for the whole duration of the waiting period for the fourth cell 1115. Accordingly, the mobile terminal 307 selects, after the waiting period for the fourth cell 1115 has expired, the fourth radio cell as target for a reselection.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A cell transfer controller comprising:
   a detector configured to detect radio cells available for a mobile terminal;
   a determiner configured to determine, for a first radio cell detected by the detector, a waiting period after which the radio cell is selectable by the cell transfer controller as a target cell for a cell transfer; and
   a controller, configured to increase the length of the waiting period in case that during the waiting period, the detector detects a second radio cell which fulfills a predetermined criterion; and
   wherein the determiner is further configured to determine a second waiting period after which the second radio cell is selectable by the cell transfer controller as a target cell for a cell transfer.

2. The cell transfer controller according to claim 1, wherein the determiner is configured to determine the waiting period to have a first length and the controller is configured to increase the length of the waiting period to a second length in case that during the waiting period, the detector detects a second radio cell which fulfills a predetermined criterion.

3. The cell transfer controller according to claim 2, wherein the radio cell needs to fulfill a quality criterion during the waiting period of the first length to be selectable by the cell transfer controller as a target cell for a cell transfer after the waiting period.

4. The cell transfer controller according to claim 3, wherein, in case that the controller increases the length of the waiting period, the radio cell needs to fulfill the quality criterion during the waiting period of the second length to be selectable by the cell transfer controller as a target cell for a cell transfer after the waiting period.

5. The cell transfer controller according to claim 3, wherein the quality criterion is that the reception quality of the first radio cell at the mobile terminal is above a predetermined threshold.

6. The cell transfer controller according to claim 1, wherein the predetermined criterion is that the second radio cell has a higher selection priority than the first radio cell.

7. The cell transfer controller according to claim 1, wherein the predetermined criterion is that the second radio cell has a better reception quality at the mobile terminal than the first radio cell.

8. The cell transfer controller according to claim 1, wherein the controller is configured to increase the length of the waiting period such that the waiting period contains the second waiting period.

9. The cell transfer controller according to claim 1, wherein the second radio cell needs to fulfill a second quality criterion during the second waiting period to be selectable by the cell transfer controller as a target cell for a cell transfer after the second waiting period.

10. The cell transfer controller according to claim 9, wherein the second quality criterion is that the reception quality of the second radio cell at the mobile terminal is above a second predetermined threshold.

11. The cell transfer controller according to claim 1, wherein the controller is configured to decrease the waiting period in case that during the second waiting period, the second radio cell does not fulfill the second quality criterion.

12. The cell transfer controller according to claim 11, wherein the controller is configured to end the waiting period during the second waiting period when the second radio violates the second quality criterion.

13. The cell transfer controller according to claim 1, wherein the mobile terminal is a subscriber terminal of a cellular mobile communication network and the radio cells are radio cells of the cellular mobile communication network.

14. A cell transfer controller comprising:
   a detector configured to detect radio cells available for a mobile terminal;
   a determiner configured to determine, for a first radio cell detected by the detector, a waiting period after which the radio cell is selectable by the cell transfer controller as a target cell for a cell transfer; and
   a controller, configured to increase the length of the waiting period in case that during the waiting period, the detector detects a second radio cell which fulfills a predetermined criterion; and
   wherein the cell transfer is a cell transfer from a current radio cell of the mobile terminal and the waiting period is decreased in case that the current radio cell violates a serving cell criterion.

15. The cell transfer controller according to claim 14, wherein the waiting period is ended when the current radio cell violates the serving cell criterion.

16. The cell transfer controller according to claim 14, wherein the serving cell criterion is based on the reception quality of the current radio cell at the mobile terminal.

17. Method for selecting a radio cell comprising:
   detecting radio cells available for a mobile terminal;
   determining, for a detected first radio cell, a waiting period after which the radio cell is selectable as a target cell for a cell transfer, and
   increasing the length of the waiting period in case that during the waiting period,
   a second radio cell is detected which fulfills a predetermined criterion; and
   determining a second waiting period after which the second radio cell is selectable as a target cell for a cell transfer.

18. The method according to claim 17, comprising determining the waiting period to have a first length and increasing the length of the waiting period to a second length in case that during the waiting period, the a second radio cell is detected which fulfills a predetermined criterion.

19. The method according to claim 18, wherein the radio cell needs to fulfill a quality criterion during the waiting period of the first length to be selectable as a target cell for a cell transfer after the waiting period.

20. The method according to claim 19, wherein, in case that the length of the waiting period is increased, the radio cell needs to fulfill the quality criterion during the waiting period of the second length to be selectable as a target cell for a cell transfer after the waiting period.

21. The method according to claim 19, wherein the quality criterion is that the reception quality of the first radio cell at the mobile terminal is above a predetermined threshold.

* * * * *